United States Patent
Wright

(10) Patent No.: US 8,100,406 B2
(45) Date of Patent: Jan. 24, 2012

(54) SEALING DEVICE

(75) Inventor: Christopher Wright, Bristol (GB)

(73) Assignee: Rolls-Royce PLC, London (GB)

( * ) Notice: Subject to any disclaimer, the term of this patent is extended or adjusted under 35 U.S.C. 154(b) by 407 days.

(21) Appl. No.: 12/385,205

(22) Filed: Apr. 1, 2009

(65) Prior Publication Data
US 2009/0322038 A1 Dec. 31, 2009

(30) Foreign Application Priority Data
Jun. 30, 2008 (GB) .................... 0811885.3

(51) Int. Cl.
F01D 11/02 (2006.01)
F16J 15/44 (2006.01)
(52) U.S. Cl. ....................................... 277/355
(58) Field of Classification Search .................... 277/355
See application file for complete search history.

(56) References Cited

U.S. PATENT DOCUMENTS

| 4,202,554 | A | * | 5/1980 | Snell | 277/355 |
| 4,214,930 | A | * | 7/1980 | Burrous | 156/1 |
| 5,099,886 | A | * | 3/1992 | Squirrell | 137/856 |
| 5,542,684 | A | * | 8/1996 | Squirrell | 277/411 |
| 6,267,381 | B1 | * | 7/2001 | Wright | 277/355 |
| 6,527,274 | B2 | * | 3/2003 | Herron et al. | 277/301 |
| 6,739,592 | B2 | * | 5/2004 | Kono | 277/355 |
| 2002/0109304 | A1 | * | 8/2002 | Herron et al. | 277/500 |
| 2002/0140175 | A1 | * | 10/2002 | Kono | 277/355 |
| 2008/0107525 | A1 | | 5/2008 | Adis et al. | |

FOREIGN PATENT DOCUMENTS

| EP | 0 933 567 A2 | 8/1999 |
| EP | 1 785 648 A2 | 5/2007 |
| WO | WO 2004/088180 A2 | 10/2004 |

OTHER PUBLICATIONS

European Search Report dated Oct. 28, 2009 for European Application No. EP 09 25 0917.3.
Great Britain Search Report dated Oct. 14, 2008 for Great Britain Application No. GB0811885.3.

* cited by examiner

Primary Examiner — Thomas Beach
Assistant Examiner — Nicholas L Foster
(74) Attorney, Agent, or Firm — Oliff & Berridge PLC

(57) ABSTRACT

A gap 6 between a stationary component 2 and a rotating component 4 is sealed by means of a leaf seal comprising an array of leaves 8, 9. The leaves 8, 9 are disposed in pairs, comprising a higher curvature leaf 8 and a lower curvature leaf 9 which contact each other resiliently at their tips 12. The contact at the tips 12 provides a damping effect. As a result, the tips 12 of the leaves 8, 9 are relatively stable when subjected to an air flow F, enabling damaging flutter to be suppressed.

10 Claims, 2 Drawing Sheets

SEALING DEVICE

This invention relates to a sealing device for providing a seal in a gap between first and second components, and is particularly, although not exclusively, concerned with such a device for sealing a gap between a stationary component and a rotating component in a gas turbine engine.

EP 1785648 discloses a leaf seal for use in a gas turbine engine, which comprises a densely packed array of sheets or leaves which are held by an annular carrier fixed to a stationary component of the gas turbine engine. The leaves project inwardly from the carrier to contact, or terminate close to, a rotating shaft of the engine. The leaves are inclined to the radial direction and the array of leaves can flex in response to radial movement or dimensional change of the shaft so that, together, they maintain a densely packed structure within the gap between the stationary component and the shaft, so as to support a pressure difference across the gap.

Each strip, or leaf, has a leading edge exposed to the high pressure side of the gap and a trailing edge exposed to the low pressure side. The plane of each leaf may be aligned with the axial direction of the shaft, or may be inclined to this direction.

In some circumstances, one or more of the leaves of such a seal may exhibit flutter. By flutter is meant an unstable rotational oscillation of the leaf about an axis extending in the lengthwise direction of the leaf, i.e. from the fixed end of the leaf held by the carrier to the tip of the leaf adjacent the shaft. Flutter is damaging, and will often ruin the seal. Flutter usually starts locally within the seal; the affected leaves flap with considerable energy and hit adjacent leaves causing damage. If a number of leaves become damaged, the seal with deteriorate. The onset of flutter usually occurs very rapidly.

In the leaf seal disclosed in EP 1785648, flutter is inhibited by arranging the leaves so that they contact one another at their tips. The contact is achieved by controlling the inclination of each leaf with respect to the circumferential direction or by providing bumps at the tips of the leaves for contact with an adjacent leaf. The leaves thus provide continuous contact with each other at their tips around the axis of the shaft. This restricts the flexibility of the seal in response to movement of the shaft, and so can increase wear at the leaf tips.

According to the present invention, there is provided a sealing device for providing a seal in a gap between first and second components, the sealing device comprising an array of leaves, each leaf extending across the gap from a fixed end which is supported with respect to the first component to a tip which contacts or is adjacent to a surface of the second component, characterised in that the array of leaves includes at least one pair of adjacent leaves of different curvature from each other, the lower curvature leaf being disposed on the concave side of the higher curvature leaf whereby the adjacent leaves are spaced apart from each other at an intermediate region between their fixed ends and their tips, and resiliently contact each other at their tips.

In the context of the present invention, references to the "tip" of a leaf is not to be interpreted strictly as meaning the extreme end of the leaf. Instead, the term is used to indicate the region of the leaf near the extreme end. In particular, references to adjacent leaves contacting each other at their tips include circumstances in which the tip (in the sense of the extreme end) of one of the leaves contacts a region of the other leaf which is close to, but spaced from the extreme end of the other leaf.

In the context of the present invention, references to "higher" and "lower" curvatures refer, respectively, to curvatures which have smaller and larger radii of curvature. The curvature of a leaf may be arcuate, i.e. have a common radius of curvature over its full extent from its fixed end to its tip, but alternatively the radius of curvature of at least one of the leaves of a pair of adjacent leaves may have a varying radius of curvature along its length. Where the radius of curvature of a leaf varies along its length, determination as to whether a leaf has a higher or lower curvature is based on the minimum radius of curvature of the leaf. Alternatively the leaf may comprise a number of flat sections bent at one or more locations along their length to form a curve.

The higher and lower curvature leaves may curve in the same sense or orientation. Accordingly the higher and lower curvature leaves may curve in the same sense but to greater and lesser extent respectively. The lower curvature leaf may have a curvature so slight that the leaf appears approximately flat or planar in form.

The leaves may be resilient, for example they may be made from thin steel sheet so that they are capable of flexing to accommodate changes in the local width of the gap. Where the leaves are resilient, the pair of adjacent leaves may be biased by their own resilience into contact with each other at their tips.

Adjacent leaves may be configured so that they diverge from their fixed ends towards the intermediate region, and then converge towards their tips. The fixed ends of the adjacent leaves may be close to, or in contact with, each other so that the adjacent leaves define between them a space which is of an elongated crescent shape. The leaves in the array may be alternately higher curvature leaves and lower curvature leaves over the full extent of the array. Alternately, there may be at least one further leaf adjacent the lower curvature leaf of the pair on the side opposite the higher curvature leaf, the further leaf having the same curvature as the lower curvature leaf. Alternatively, or in addition, there may be at least one further leaf adjacent the higher curvature leaf of the pair on the side opposite the lower curvature leaf, the further leaf having the same curvature as the higher curvature leaf. Consequently, the lower curvature leaf and/or the higher curvature leaf of the pair of adjacent leaves may be the endmost leaf of a stack of two or more leaves of the same curvature.

The present invention also provides an assembly comprising a stationary component and a rotor which is rotatable relatively to the stationary component, and a sealing device as defined above, the sealing device providing a seal in a gap between the stationary component and the rotor.

Another aspect of the present invention provides a gas turbine engine including an assembly as defined above.

For a better understanding of the present invention, and to show more clearly how it may be carried into effect, reference will now be made, by way of example, to the accompanying drawings, in which.

Figure 1:
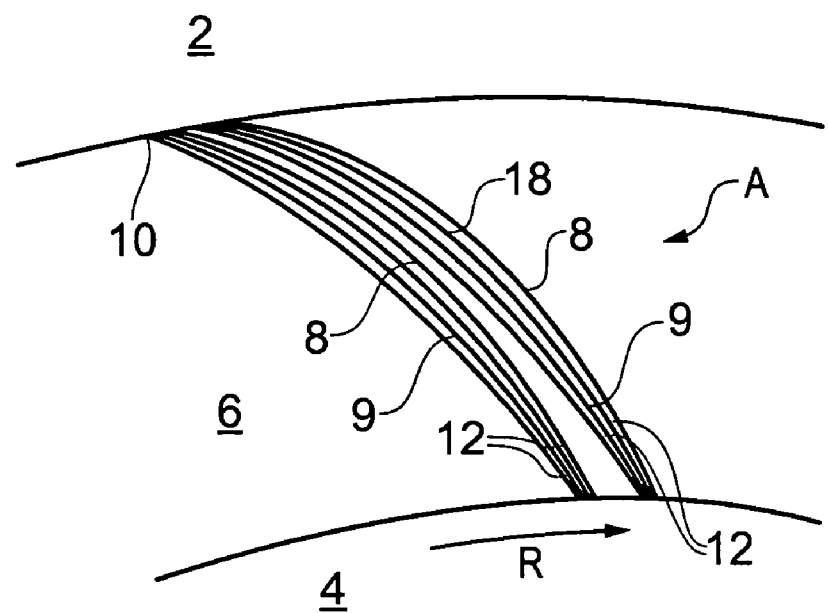
FIG. 1 is a schematic representation of a leaf seal.
Figure 3:
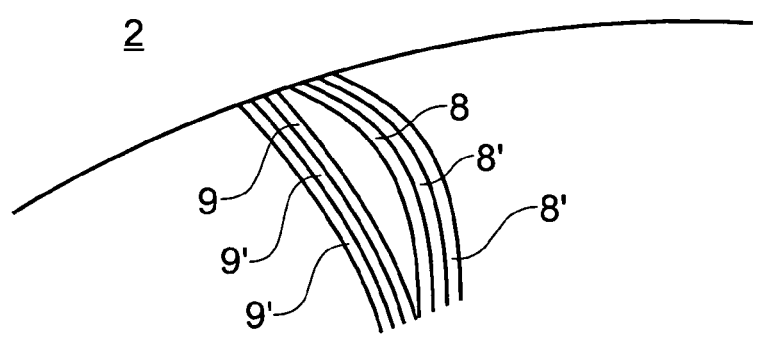

FIG. 3 corresponds to FIG. 1 but shows an alternative embodiment; and

Figure 4:
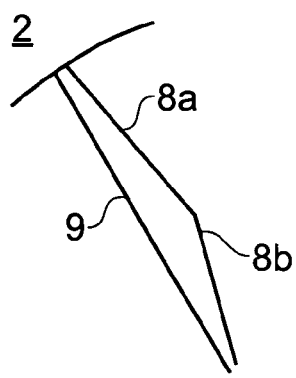
Figure 5:
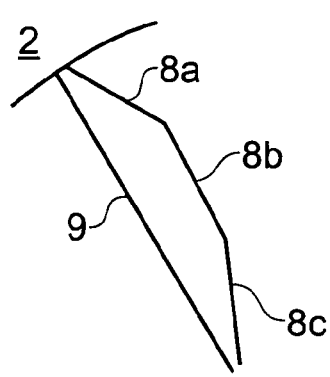
Figure 6:
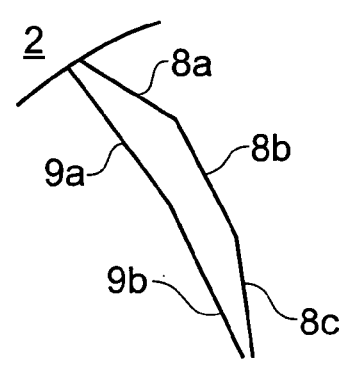

FIGS. 4 to 6 show alternative embodiments of the invention in which the curve of the leaf seal is formed by a number of flat sections.

The leaf seal shown in FIG. 1 provides a seal between a stationary component generally indicated at 2 and a rotating component generally indicated at 4. FIG. 1 is a view in the axial direction of the rotating component 4. In a particular embodiment, the stationary component 2 may be fixed to a casing of a gas turbine engine, and the rotating component 4 may be a shaft or rotor of the engine.

A gap 6 is left between the fixed component 2 and the rotating component 4. This gap 6 is sealed by means of a leaf seal which comprises densely packed flexible leaves 8, 9 for example of steel, which are each fixed at one end 10 to a carrier secured to the fixed component 2. The other end, or tip, 12 of each leaf 8 contacts, or at least lies close to, the surface of the rotating component 4.

It will be appreciated that the leaves 8 are inclined to the perpendicular direction across the gap 6 in a direction corresponding to the direction of rotation R of the rotating component 4. The leaves 8 are densely packed so as to seal across the gap 6 and support a pressure difference between a higher pressure $P_1$ and a lower pressure $P_2$, as shown in FIG. 2.

Figure 2:
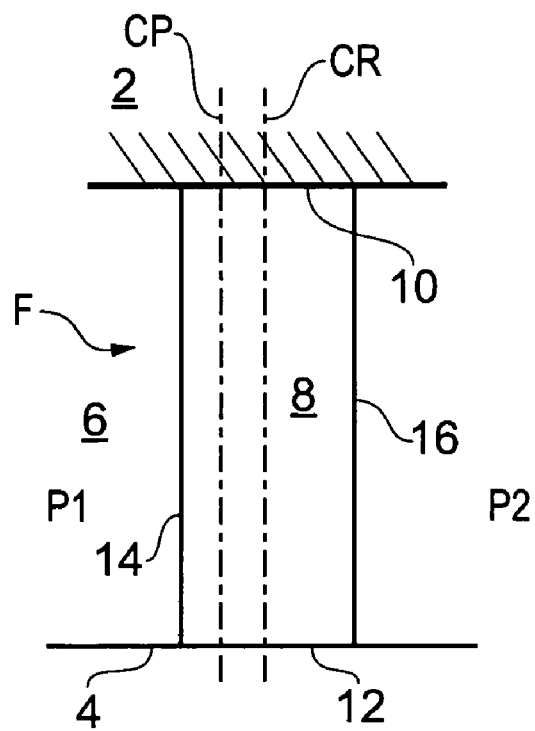
FIG. 2 is a view in the direction A of the leaf seal of FIG. 1.

As shown schematically in FIG. 2, each leaf 8 is generally rectangular, although other configurations are possible. Each leaf 8 has leading and trailing edges 14, 16 which lie in respective planes which extend radially of the axis (not shown) of the rotating component 4. The leading edge 14 is exposed to the higher pressure $P_1$ while the trailing edge 16 is exposed to the lower pressure $P_2$. Thus, the respective edges 14 and 16 are leading and trailing with respect to the direction of flow F across the seal.

Each leaf 8 is clamped rigidly by the carrier which is fixed to the stationary component 2. Each leaf 8 has a centre of torsion, or centre of rotation, $C_R$ which is determined by the geometry of the leaf 8. The centre of torsion $C_R$ is the axis which experiences no displacement when the tip 12 is twisted relatively to the fixed end 10. In general, the centre of torsion $C_R$ is at or close to the geometric centreline of the leaf 8.

Each leaf 8 also has a centre of pressure $C_P$ which is the position, in the chordwise direction of the leaf 8, at which acts the pressure generated by an airflow over the leaf 8. In general, the centre of pressure $C_P$ is situated approximately 25% of the chordwise width of the leaf 8 from the leading edge 14.

It will be appreciated that, for the conventional leaf 8 shown in FIG. 2, the centre of pressure $C_P$ is upstream of the centre of torsion $C_R$ with respect to the direction of air flow represented by the arrow F across the seal from the high pressure $P_1$ to the low pressure $P_2$. The leaf 8 is consequently unstable, since any deviation of the leaf 8 from perfect alignment with the air flow F will result in a torque being generated in the sense to increase the deviation. The resilience of the leaf 8 will resist deflection, and the leaf 8 will consequently flutter about the centre of torsion $C_R$.

The configuration of the leaves 8, 9 as shown in FIG. 1 serves to damp any torsional oscillation of the leaves 8, 9, so as to minimise or avoid flutter. Thus, the leaves 8, 9 are disposed in pairs, each pair comprising a leaf 8 of relatively high curvature (i.e. relatively small radius of curvature) and a leaf 9 of relatively low curvature (i.e. of relatively large radius of curvature). The leaves 8, 9 of each pair are disposed relatively to each other so that they initially diverge from their fixed ends 10 to an intermediate region 18 and then converge towards their tips 12. The leaves 8, 9 are made from steel sheet, and the contact between the tips 12 is established by the flexural resilience of the leaves 8, 9. The contact pressure between the tips 12 is therefore determined by the relative curvatures of the leaves 8, 9 and their flexural stiffness.

The fixed ends 10 of the leaves 8, 9 of each pair are secured to the carrier fixed to the stationary component 2 at a relatively close spacing from each other, and possibly in contact with each other. Consequently, the space between the leaves 8, 9, including the intermediate region 18, is in the form of an elongated, narrow crescent, as is visible in the axial view shown in FIG. 1.

It will be appreciated that any deflection of the leaves 8, 9 about the centre of rotation $C_R$ will be accompanied by relative movement between the tips 12. Such movement will be resisted by the friction between the tips 12, so damping any tendency for the leaves to flutter.

It will be appreciated that, should the tips 12 of the leaves 8, 9 wear during rotation of the shaft 4 relative to the stationary component 2, the resilience of the leaves 8, 9 will nevertheless cause the receding tips 12 to remain in contact with each other, so maintaining the frictional damping effect.

In FIG. 1 the array of leaves 8, 9 is arranged as alternating higher curvature leaves 8 and lower curvatures leaves 9. Consequently, each pair of leaves 8, 9 consists of only one leaf of each degree of curvature, and the array of leaves 8, 9 consists of adjacent pairs of such leaves. In some circumstances, the contact pressure that can be achieved at the tips 12 with such an arrangement may be insufficient to achieve adequate suppression of flutter. Consequently, in an alternative embodiment as shown in FIG. 3, each pair of leaves 8, 9 may be reinforced by supplementary leaves 8', 9' which are disposed on the face of the respective leaves 8, 9 facing away from the counterpart leaf 9, 8 of the respective pair. The supplementary leaves 8', 9' have the same extent of curvature as the respective leaf 8, 9 of the pair, so that they form a stack of leaves with a resulting increased flexural rigidity, so increasing the contact pressure at the tips 12 compared with the embodiment of FIG. 1.

In FIG. 3, each leaf 8, 9 of the pair is provided with two supplementary leaves 8', 9'. However, it will be appreciated that different numbers of supplementary leaves may be provided according to the contact pressure required.

If FIG. 4 an alternative embodiment is shown in which the higher curvature leaf 8 comprises a first flat section 8a and a second flat section 8b which are angled relative to one another to form a curved leaf 8. Alternatively, and as shown in FIG. 5, the higher curvature leaf 8 comprises three flat sections 8a, 8b and 8c, which are angled relative to one another to form a curved leaf 8. Additionally, and as shown in FIG. 6, the lower curvature leaf 9 likewise may comprise a first flat section 9a and a second flat section 9b which are angled relative to one another to form a curved leaf 9. The number of flat sections and bends between them can be varied according to the required angle of curvature and desired leaf 8,9 profile. For example, the leaves 8,9 may comprise a large number of flat sections and bends to form a substantially continuous curved profile.

The higher and lower curvature leaves in the above embodiments curve in the same sense such that each of the higher and lower curvature leaves curve in a corresponding concave or convex manner dependent on the direction of reference.

The invention claimed is:

1. A sealing device for providing a seal in a gap between first and second components, the sealing device comprising:
   a plurality of arrays of sealing leaves, each sealing leaf extending across the gap from a fixed end which is supported with respect to the first component to a tip which contacts or is adjacent to a surface of the second component to seal the gap between the first and second components,
   wherein the plurality of arrays of sealing leaves includes at least one pair of adjacent sealing leaves of different curvature from each other arranged such that a lower curvature sealing leaf is disposed on the concave side of a higher curvature sealing leaf
   whereby the adjacent sealing leaves of said pair are spaced apart from each other at an intermediate region between their fixed ends and their tips, and resiliently contact each other at their tips.

2. The sealing device of claim 1, wherein the leaves are resilient and are biased by the resilience of the leaves into contact with each other at their tips.

3. The sealing device of claim 1, wherein adjacent leaves of the, or each, pair of leaves diverge in the direction from their fixed ends to the intermediate region, and then converge from the intermediate region to their tips.

4. The sealing device of claim 1, wherein alternate leaves in the array are respectively higher curvature leaves and lower curvature leaves.

5. The sealing device of claim 1, further comprising at least one further leaf adjacent the higher curvature leaf of each pair of leaves, the at least one further leaf having substantially the same curvature as the higher curvature leaf.

6. The sealing device of claim 1, further comprising at least one further leaf adjacent the lower curvature leaf of each pair of leaves, said further leaf having the same curvature as the lower curvature leaf.

7. The sealing device of claim 1, wherein at least one of the leaves includes flat sections which are angled relative to one another to form a curved leaf.

8. The sealing device of claim 1, wherein the higher and lower curvature leaves of said pair curve toward a same direction.

9. An assembly comprising a stationary component and a rotor which is rotatable relative to the stationary component, and the sealing device of claim 1, the sealing device providing a seal in a gap between the stationary component and the rotor.

10. A gas turbine engine including an assembly as claimed in claim 9.

* * * * *